(12) United States Patent
Yi et al.

(10) Patent No.: US 12,009,953 B1
(45) Date of Patent: Jun. 11, 2024

(54) METHOD FOR PROCESSING AUTOMATIC IDENTIFICATION SYSTEM (AIS) BASEBAND SIGNAL BASED ON FIELD-PROGRAMMABLE GATE ARRAY (FPGA)

(71) Applicant: Transport Planning and Research Institute Ministry of Transport, Beijing (CN)

(72) Inventors: Zhongli Yi, Beijing (CN); Shanshan Wang, Beijing (CN); Weichang Wang, Beijing (CN); Shengli Liu, Beijing (CN); Fuzhai Wang, Beijing (CN); Xinrui Zheng, Beijing (CN); Xuege Yang, Beijing (CN)

(73) Assignee: Transport Planning and Research Institute Ministry of Transport, Beijing (CN)

( * ) Notice: Subject to any disclaimer, the term of this patent is extended or adjusted under 35 U.S.C. 154(b) by 0 days.

(21) Appl. No.: 18/408,621

(22) Filed: Jan. 10, 2024

(30) Foreign Application Priority Data

Jan. 10, 2023 (CN) .......................... 202310029995.3

(51) Int. Cl.
*H04L 27/06* (2006.01)
*H04L 27/00* (2006.01)
*H04L 27/12* (2006.01)

(52) U.S. Cl.
CPC .......... *H04L 27/0014* (2013.01); *H04L 27/06* (2013.01); *H04L 27/12* (2013.01); *H04L 2027/0026* (2013.01)

(58) Field of Classification Search
CPC ......... H04L 27/06; H04L 27/14; H04L 27/12; H04L 27/0014; H04L 2027/0026
See application file for complete search history.

(56) References Cited

U.S. PATENT DOCUMENTS 8,374,292 B2 * 2/2013 Peach ................ H04B 7/18513
375/150

FOREIGN PATENT DOCUMENTS

| CN | 101699314 A | 4/2010 |
| CN | 203691422 U | 7/2014 |

(Continued)

OTHER PUBLICATIONS

ITU-R M. 1371-5, Technical characteristics for an automatic identification system using time division multiple access in the VHF maritime mobile frequency band, International Telecommunication Union, 2014, pp. 1-146.

*Primary Examiner* — Rahel Guarino
(74) *Attorney, Agent, or Firm* — Bayramoglu Law Offices LLC

(57) ABSTRACT

A method for processing an automatic identification system (AIS) baseband signal based on a field-programmable gate array (FPGA) is provided. A signal output by a bus is cached in a message buffer and then sent to a Gaussian filtered minimum shift keying (GMSK) modulator after being encoded by a frame encoder. Another signal output by the bus is processed by an AIS access control module and then also sent to the GMSK modulator. The two signals output by the bus are respectively output to two digital to analog converters (DACs) after being modulated by the GMSK modulator; a digital signal is converted into an analog signal, and the analog signal is sent to an I/Q or two-point modulation radio frequency (RF) circuit. Two received baseband signals are respectively input into analog to digital converters (ADCs) and separately sent to the bus.

1 Claim, 4 Drawing Sheets

(56) References Cited

FOREIGN PATENT DOCUMENTS

| | | |
|---|---|---|
| CN | 104009810 A | 8/2014 |
| CN | 206341238 U | 7/2017 |
| EP | 3208629 A1 | 8/2017 |
| WO | 2010106280 A1 | 9/2010 |

* cited by examiner

METHOD FOR PROCESSING AUTOMATIC IDENTIFICATION SYSTEM (AIS) BASEBAND SIGNAL BASED ON FIELD-PROGRAMMABLE GATE ARRAY (FPGA)

CROSS-REFERENCE TO THE RELATED APPLICATIONS

This application is based upon and claims priority to Chinese Patent Application No. 202310029995.3, filed on Jan. 10, 2023, the entire contents of which are incorporated herein by reference.

TECHNICAL FIELD

The present disclosure relates to the technical field of automatic identification system (AIS) baseband signal processing, and specifically, to a method for processing an AIS baseband signal based on a field-programmable gate array (FPGA).

BACKGROUND

An automatic identification system (AIS) is a system that can provide relevant information for shore and ship stations based on information of a global positioning system to track and monitor a maritime vessel. The system operates in a very high frequency (VHF) maritime frequency band (161.975 MHz and 162.025 MHz), and can send static information, dynamic information, voyage information, and the like of a ship. The static information includes a maritime mobile service identity (MMSI) number, a call sign, a name, length and width information, a type, and the like of the ship. The dynamic information includes a current navigation position, speed, heading, and the like of the ship. The voyage information includes a draft depth, a cargo type, a destination port, and the like of a current voyage.

The AIS uses a Gaussian filtered minimum shift keying (GMSK) modulation method, and a training sequence used for synchronization is in a format of 010101 . . . . The sequence has poor autocorrelation property, which is manifested by a large correlated peak sidelobe and a weak anti-frequency offset capability.

The existing AIS is generally completed by using an existing baseband chip, and a solution from CML in the UK is generally used. Currently, the chip is of a single type and expensive.

SUMMARY

An objective of the present disclosure is to provide a method for processing an AIS baseband signal based on an FPGA, to resolve the problems described in BACKGROUND.

To achieve the above objective, the present disclosure provides a following technical solution: A method for processing an AIS baseband signal based on an FPGA is provided, where an FPGA functional block and a peripheral circuit are included; the peripheral circuit includes a digital to analog converter (DAC), an analog to digital converter (ADC), a host microprogrammed control unit (MCU), a global navigation satellite system (GNSS) module, a temperature compensated crystal oscillator (TCXO), and a reset and power control module; the FPGA functional block includes a bus, a plurality of message buffers, an AIS access control module, a GMSK modulator, a frame encoder, an AIS physical layer demodulator, and a frame decoder; an output of the bus is connected to one message buffer and one AIS access control module; an output of the AIS access control module is connected to the GMSK modulator; the one message buffer connected to the output of the bus is connected to the frame encoder; an output of the frame encoder is connected to the GMSK modulator; an signal output by the bus is cached in the message buffer and then sent to the GMSK modulator after being encoded by the frame encoder; another signal output by the bus is processed by the AIS access control module and then also sent to the GMSK modulator; the two signals output by the bus are respectively output to two DACs after being modulated by the GMSK modulator; a digital signal is converted into an analog signal, and the analog signal is sent to an I/Q or two-point modulation radio frequency (RF) circuit; and two received baseband signals are respectively input into ADCs and separately sent to the bus through the AIS physical layer demodulator, the frame decoder, and the message buffer in sequence.

Preferably, the TCXO enables a clock generator to generate a stable-frequency clock pulse, and is connected to the bus to output the clock pulse to the bus; the host MCU is connected to an MCU interface control module and then connected to the bus, and the host MCU is also connected to the reset and power control module to provide power input and reset functions; and the GNSS module is connected to a GNSS interface of the FPGA functional block, such that the GNSS module is connected.

Preferably, the AIS access control module is responsible for accessing an AIS signals, including AIS timeslot calculation and sending time window control; the message buffer is connected to the frame encoder, the output of the frame encoder is connected to the GMSK modulator; and the frame encoder is responsible for packaging a physical frame of the AIS signal, including filling a bit, adding a training sequence, and operating a frame start signal, a cyclic redundancy check (CRC) signal, and a frame end signal.

Preferably, the GMSK modulator is configured to modulate the AIS signal. In order to reduce use of an FPGA logic unit, a modulation method of the GMSK modulator is specifically implemented as follows by using a look-up table (LUT) method: inputting data, generating a phase path table, obtaining a phase at a current time point, calculating I and Q signals, generating a corresponding LUT, and obtaining I and Q signals at the current time point based on the LUT.

Preferably, the AIS physical layer demodulator is a demodulator for an AIS baseband signal, which internally includes synchronization and demodulation processes and outputs a bit output sequence obtained after AIS demodulation.

Preferably, a count calibration method of the AIS access control module is as follows: the AIS access control module first calculates an accurate start point of an AIS timeslot based on a serial port signal and a pulse-per-second signal that are connected to the GNSS module; and the GNSS module generates a pulse signal per second, with an accuracy of up to nanoseconds, waits for a generated pulse per second, inputs read serial port time, and adjusts and calibrates an internal timer in the case of even seconds, or waits for a pulse per second again in the case of non-even seconds.

The present disclosure has following technical effects and advantages: The method for processing an AIS baseband signal based on an FPGA is implemented by using a universal FPGA, which has a low implementation cost and a low requirement for a front-end ADC and can achieve excellent AIS baseband performance, thereby greatly reducing an implementation cost of an AIS. In addition, a universal FPGA solution is adopted, which has no specific requirement for a chip model, thereby further saving the cost.

DETAILED DESCRIPTION OF THE EMBODIMENTS

The specific implementations of the present disclosure are further described below with reference to the accompanying drawings. It should be noted herein that the description of these implementations is used to help understand the present disclosure, but does not constitute a limitation to the present disclosure. Further, the technical features involved in the various implementations of the present disclosure described below may be combined with each other as long as they do not constitute a conflict with each other.

Figure 1:
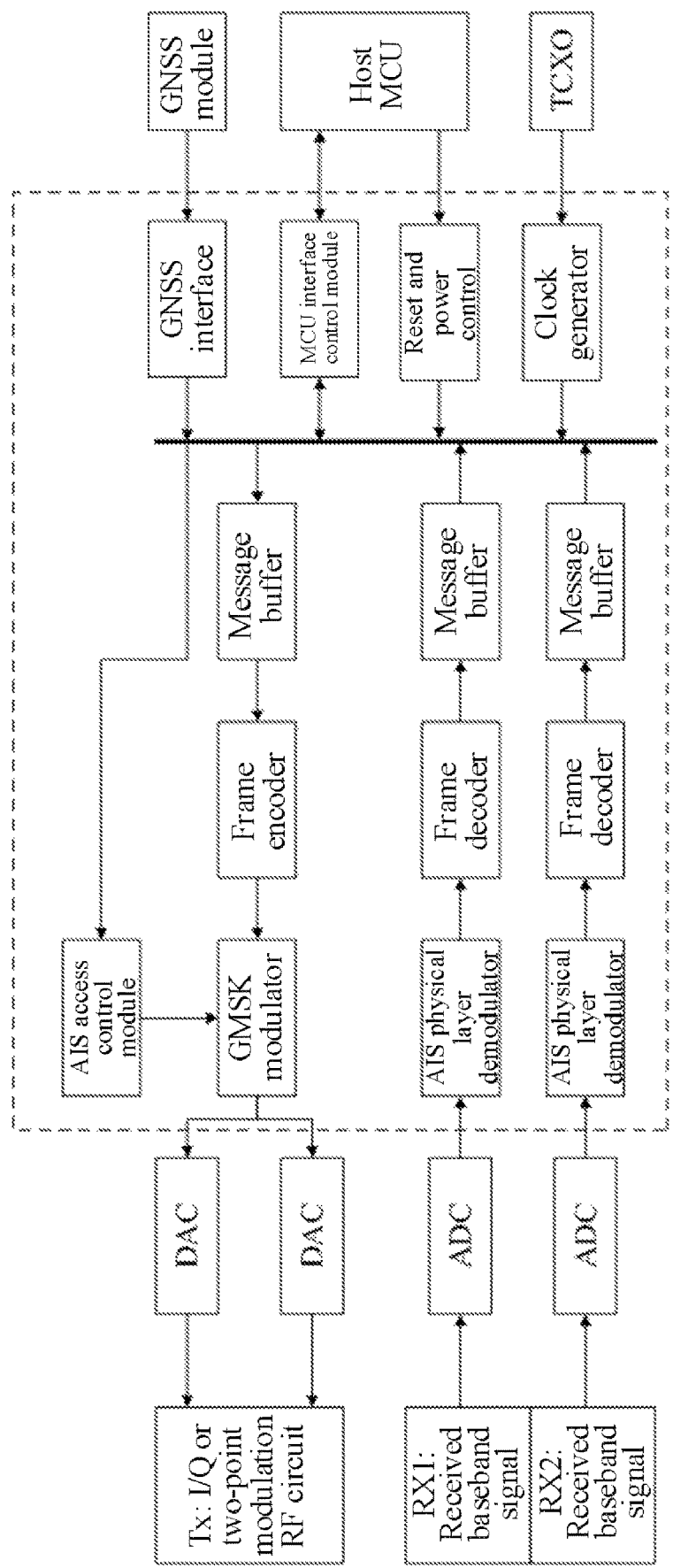
FIG. 1 is a block diagram of a system according to the present disclosure.

The present disclosure provides a method for processing an AIS baseband signal based on an FPGA, as shown in FIG. 1. An FPGA functional block and a peripheral circuit are included. The peripheral circuit includes a DAC, an ADC, a host MCU, a GNSS module, a TCXO, and a reset and power control module. A sampling rate of the ADC is 1 MPSP, with significant digits being 7 bits, which does not have a high requirement for a front-end ADC. The TCXO enables a clock generator to generate a stable-frequency clock pulse, and is connected to a bus to output the clock pulse to the bus. The host MCU is connected to an MCU interface control module and then connected to the bus, and the host MCU is also connected to the reset and power control module to provide power input and reset functions. The GNSS module is connected to a GNSS interface of the FPGA functional block, such that the GNSS module is connected.

Figure 3:
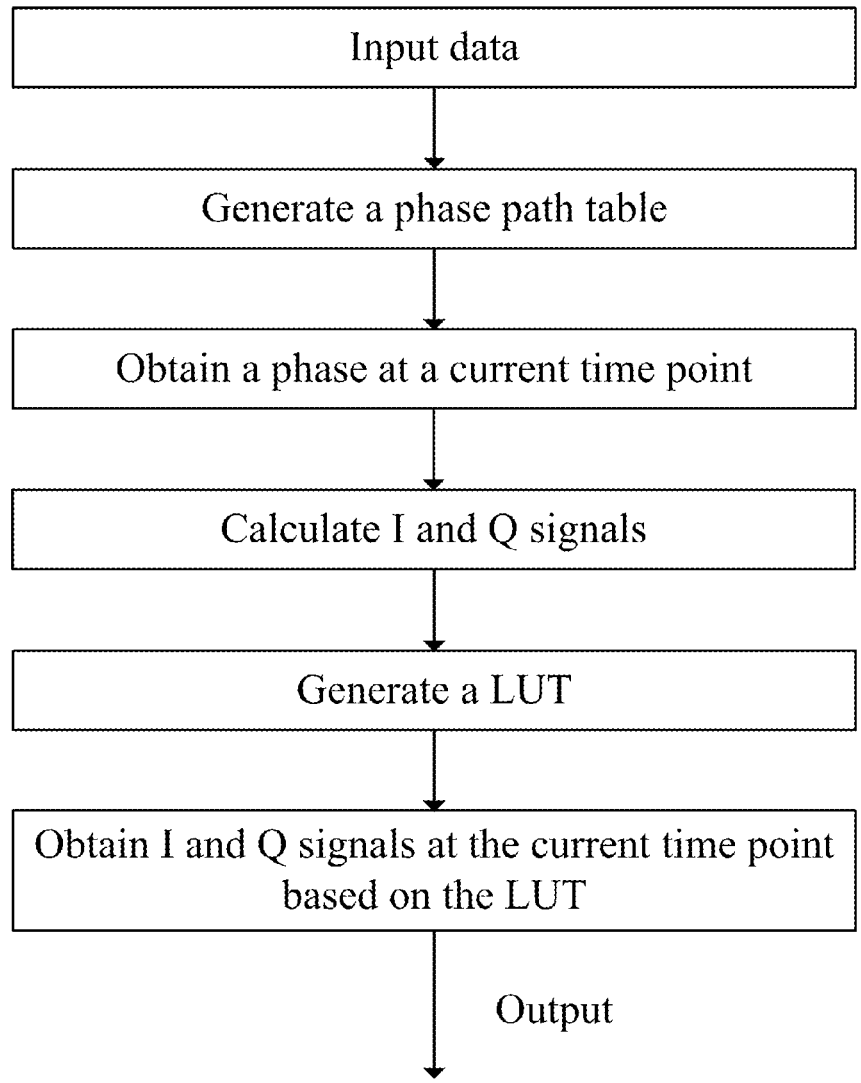
FIG. 3 is a flowchart of obtaining a signal by a GMSK modulator based on a LUT according to the present disclosure.

FPGA functional block: An output of the bus is connected to one message buffer and one AIS access control module. An output of the AIS access control module is connected to a GMSK modulator. The message buffer is configured to cache a message. The AIS access control module is responsible for accessing an AIS signal, including AIS timeslot calculation and sending time window control. The message buffer is connected to a frame encoder, and an output of the frame encoder is connected to the GMSK modulator. The frame encoder is responsible for packaging a physical frame of the AIS signal, including filling a bit, adding a training sequence, and operating a frame start signal, a CRC signal, and a frame end signal. The GMSK modulator is responsible for modulating the AIS signal, and generates an analog modulated signal from an original digital AIS signal based on a LUT. An output of the GMSK modulator is connected to two DACs to convert a digital signal into an analog signal that is sent to an I/Q or two-point modulation RF circuit. I and Q are RF signals. As shown in FIG. 3, an AIS is a GMSK modulation system. Therefore, the GMSK modulator can be configured to modulate the AIS signal. In order to reduce use of an FPGA logic unit, a modulation method of the GMSK modulator is specifically implemented as follows by using a LUT method: inputting data, generating a phase path table, obtaining a phase at a current time point, calculating I and Q signals, generating a corresponding LUT, and obtaining I and Q signals at the current time point based on the LUT.

Two received baseband signals RX1 and RX2 are respectively input into ADCs and separately sent to the bus through an AIS physical layer demodulator, a frame decoder, and the message buffer in sequence. The AIS physical layer demodulator is a demodulator for an AIS baseband signal, which internally includes synchronization and demodulation processes. In the synchronization process, an autocorrelation algorithm can be used to achieve a synchronization-related process. The autocorrelation algorithm is not sensitive to a frequency offset, can effectively avoid a problem of a weak system sequence characteristic, and outputs a bit output sequence obtained after AIS demodulation. An AIS demodulation process is the same as a demodulation process of a GMSK signal, and can be implemented by using a Viterbi demodulation method. In this implementation case, a one-bit Viterbi demodulation scheme is used, with a demodulation backtracking depth of 15, which can at least meet indicators required by a design. The frame decoder is responsible for decoding the physical frame of the AIS signal, including CRC verification, bit de-filling, and the like, to restore an original AIS data signal. The frame encoder and the frame decoder implement data encoding and decoding process in accordance with requirements of the ITU-1371-5 standard.

Figure 2:
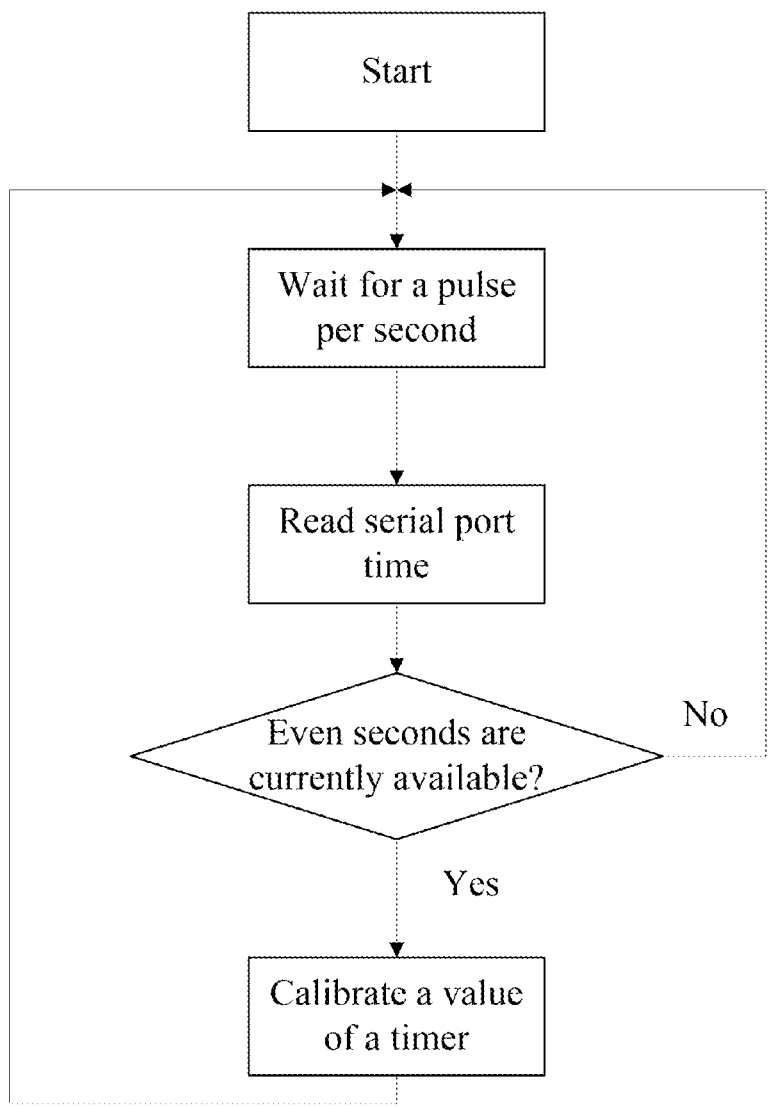
FIG. 2 is a flowchart of count calibration by an AIS access control module according to the present disclosure.

The AIS access control module first calculates an accurate start point of an AIS timeslot based on a serial port signal and a pulse-per-second signal that are connected to the GNSS module. The GNSS module generates a pulse signal per second, with an accuracy of up to nanoseconds, waits for a generated pulse per second, inputs read serial port time, and adjusts and calibrates an internal timer in the case of even seconds, or waits for a pulse per second again in the case of non-even seconds. Basic processing steps are shown in FIG. 2.

Figure 4:
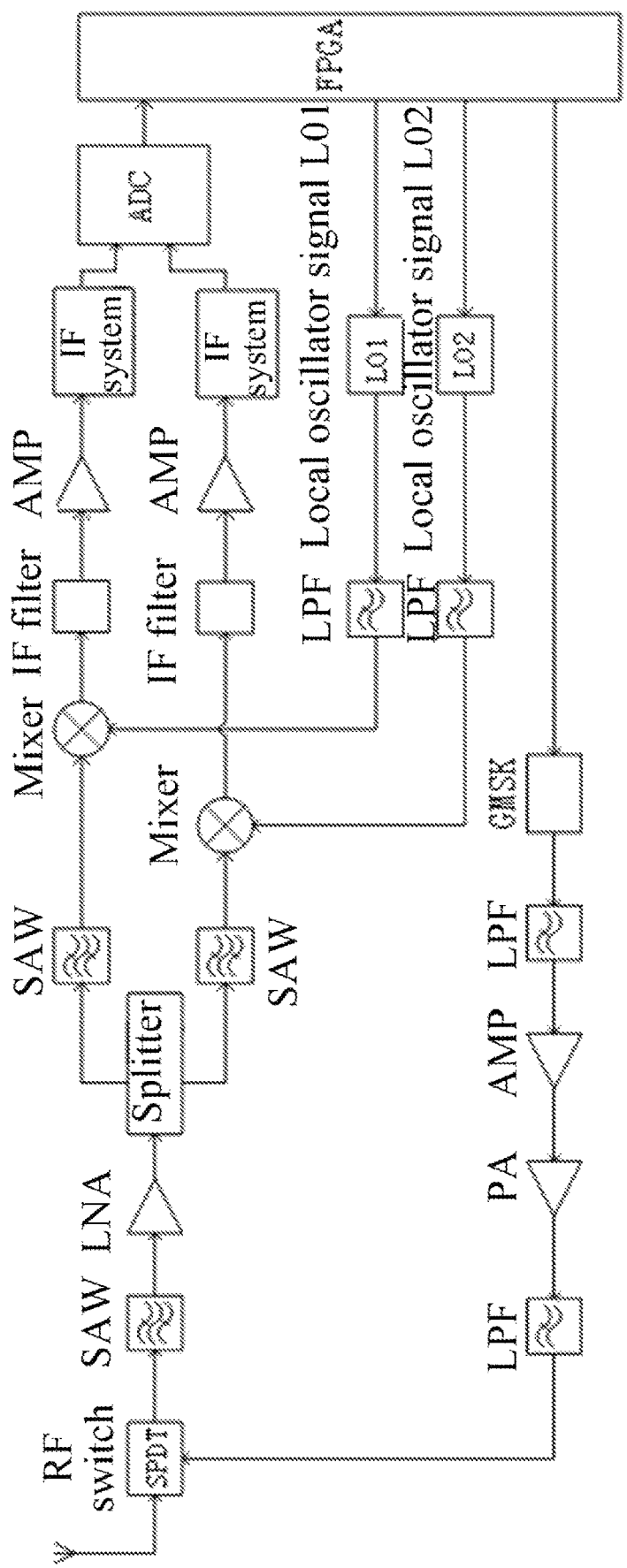
FIG. 4 is a schematic structural diagram of a baseband part according to the present disclosure.

As shown in FIG. 4, an FPGA signal is input into the GMSK modulator for modulation. A modulated FPGA signal is sequentially processed by a low-pass filter (LPF), an amplifier (AMP), a power amplifier (PA), and an LPF before being input into an input path of a single-pole double-throw (SPDT) switch (RF switch). An AIS signal received by an antenna is connected to another input path of the SPDT switch, and an output path of the SPDT switch is connected to a surface acoustic wave (SAW). The two types of signals are automatically converted and used through the SPDT switch, and then input into the SAW and a low-noise amplifier (LNA) for filtering and amplification. After that, two input signals are obtained through a splitter. The input signals are filtered by two SAWs and then input into different mixers. Local oscillator signals LO1 and LO2 emitted by an FPGA each are filtered by the LPF and then input into the mixer for mixing. Output mixed signals each pass through an MFC (intermediate frequency (IF) filter), the AMP, and an IF system in sequence before being input into a same ADC, and then processed by the ADC before being input into the FPGA.

Although the embodiments of the present disclosure have been illustrated and described above, it will be appreciated that the above embodiments are illustrative and should not be construed as limiting the present disclosure. Changes, modifications, substitutions, and variations can be made to the above embodiments by a person of ordinary skill in the art within the scope of the present disclosure.

What is claimed is:

1. A system for processing an automatic identification system (AIS) baseband signal based on a field-programmable gate array (FPGA), comprising an FPGA functional block and a peripheral circuit, wherein the peripheral circuit comprises a digital to analog converter (DAC), an analog to digital converter (ADC), a host microprogrammed control unit (MCU), a global navigation satellite system (GNSS) module, a temperature compensated crystal oscillator (TCXO), and a reset and power control module; the FPGA functional block comprises a bus, a plurality of message buffers, an AIS access control module, a Gaussian filtered minimum shift keying (GMSK) modulator, a frame encoder, an AIS physical layer demodulator, and a frame decoder; an output of the bus is connected to one message buffer and one AIS access control module; an output of the AIS access control module is connected to the GMSK modulator; the one message buffer connected to the output of the bus is connected to the frame encoder; an output of the frame encoder is connected to the GMSK modulator; and a signal output by the bus is cached in the one message buffer and then sent to the GMSK modulator after being encoded by the frame encoder; another signal output by the bus is processed by the AIS access control module and then also sent to the GMSK modulator; the two signals output by the bus are respectively output to two DACs after being modulated by the GMSK modulator; an analog signal is converted into a digital signal, and the digital signal is sent to an in-phase and quadrature (I/Q) or two-point modulation radio frequency (RF) circuit; and two received baseband signals are respectively input into ADCs and separately sent to the bus through the AIS physical layer demodulator, the frame decoder, and a second message buffer of the plurality of message buffers in sequence;

the TCXO enables a clock generator to generate a stable-frequency clock pulse, and is connected to the bus to output the stable-frequency clock pulse to the bus; the host MCU is connected to an MCU interface control module and then connected to the bus, and the host MCU is also connected to the reset and power control module to provide power input and reset functions; and the GNSS module is connected to a GNSS interface of the FPGA functional block, such that the GNSS module is connected;

the AIS access control module is responsible for accessing an AIS signal, comprising AIS timeslot calculation and sending time window control; the one message buffer is connected to the frame encoder, and the output of the frame encoder is connected to the GMSK modulator;

and the frame encoder is responsible for packaging a physical frame of the AIS signal, comprising filling a bit, adding a training sequence, and operating a frame start signal, a cyclic redundancy check (CRC) signal, and a frame end signal;

the GMSK modulator is configured to modulate the AIS signal, wherein in order to reduce use of an FPGA logic unit, a modulation of the GMSK modulator is specifically implemented as follows by using a look-up table (LUT): inputting data, generating a phase path table, obtaining a phase at a current time point, calculating I and Q signals, generating a corresponding LUT, and obtaining I and Q signals at the current time point based on the LUT;

the AIS physical layer demodulator is a demodulator for the AIS baseband signal, and internally comprises synchronization and demodulation processes and outputs a bit output sequence obtained after AIS demodulation; and a count calibration of the AIS access control module is as follows: the AIS access control module first calculates an accurate start point of an AIS timeslot based on a serial port signal and a pulse-per-second signal that are connected to the GNSS module; and the GNSS module generates a pulse signal per second, with an accuracy of up to nanoseconds, waits for the generated pulse signal per second, inputs read serial port time, and adjusts and calibrates an internal timer in the case of even seconds, or waits again for the generated pulse signal per second in the case of non-even seconds.

\* \* \* \* \*